United States Patent [19]

Mori et al.

[11] B 3,986,540

[45] Oct. 19, 1976

[54] FLUID SERVICING UNIT FOR AUTOMATIC FASTENER FEEDING AND DRIVING APPARATUS

[75] Inventors: Yubi Mori, Neyagawa; Yasuyuki Igaki, Kyoto; Syunji Sugahara, Hirakata, all of Japan

[73] Assignee: Matsushita Electric Industrial Co., Ltd., Osaka, Japan

[22] Filed: June 28, 1974

[21] Appl. No.: 484,332

[44] Published under the second Trial Voluntary Protest Program on March 2, 1976 as document No. B 484,332.

[30] Foreign Application Priority Data

July 2, 1973 Japan ................................ 48-74998

[52] U.S. Cl. ................................ 144/32 R; 137/118

[51] Int. Cl.[2] ...................... B25B 23/00; H01M 6/00

[58] Field of Search ............ 144/32; 29/240, 203 R; 137/118

[56] References Cited

UNITED STATES PATENTS

| | | | |
|---|---|---|---|
| 3,581,370 | 6/1971 | Passarella et al. | 144/32 X |
| 3,648,744 | 3/1972 | Bangerter | 144/32 |

*Primary Examiner*—Travis S. McGehee

*Assistant Examiner*—W. D. Bray

*Attorney, Agent, or Firm*—Wenderoth, Lind & Ponack

[57] ABSTRACT

A fluid servicing unit for use in an automatic fastener feeding and driving apparatus of a type including a fastener container, a fastener driving tool and a mechanism for feeding fasteners successively and one by one from the container to the driving tool, which fluid servicing unit includes an air filter, a pressure regulating valve and an oiler, all being formed and integrated in a single block without substantially requiring unnecessary pipings.

4 Claims, 3 Drawing Figures

FLUID SERVICING UNIT FOR AUTOMATIC FASTENER FEEDING AND DRIVING APPARATUS

Figure 1:
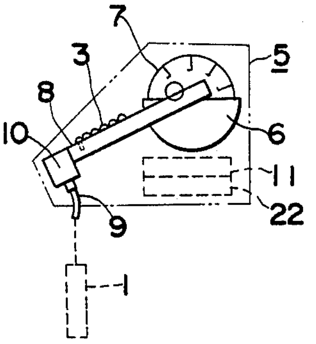

The present invention relates to a fluid servicing unit for use in an automatic fastener feeding and driving apparatus.

The automatic fastener feeding and driving apparatus generally includes a fastener container, a fastener driving head such as a power operated screw driver and a mechanism for feeding fasteners successively and one by one from the container to the driving head. For operating the automatic fastener feeding and driving apparatus in a definite manner, an air servicing unit has heretofore been employed which comprises a fluid circuit substantially composed of an air filter for filtering the air so as to eliminate foreign matter, a pressure regulating valve for reducing the fluid pressure of the filtered air to a predetermined or required value and an oiler for adding oil in the misted form to the filtrated air which is in turn supplied to drive units, such as air cylinders and an air motor, of the apparatus which require air to operate and also oil for lubrication. All of these, the filter, valve and oiler, are series-connected with respect to each other.

In the conventional fluid circuit of the type referred to above, in order for air with no misted oil to be fed to, for example, a fastener feeding unit where application of oil should be avoided, an air passage extending from the filter must be branched into two paths; one path adapted to produce through a pressure regulating valve clean air for feeding fasteners, and the other path coupled to the oiler where the air is mixed with moisted oil, and then to a screw driver to drive the latter.

The air servicing unit heretofore employed has many disadvantages. Of the disadvantages, one is that in order to individually connect filter, valve and oiler in the required arrangement, a time-consuming piping job is required, and moreover, a relatively large space for installation is required to accommodate the piping. Therefore, the air servicing unit of the type referred to above can not be advantageously suited for use in a similar apparatus of a portable type.

Accordingly, an essential object of the present invention is to provide an exceedingly simple air servicing unit for use in the automatic fastener feeding and driving apparatus which includes an air filter, a pressure regulating valve and an oiler, all formed into a single block, thereby substantially eliminating the disadvantages and inconveniences inherent in the conventional device of a similar kind.

Another object of the present invention is to provide an exceedingly simple air servicing unit of the type referred to above, which can be easily manufactured and can be easily installed in the apparatus with inexpensive maintenance.

A further object of the present invention is to provide an exceedingly simple air servicing unit of the type referred to above, wherein air entering an intake port is first filtered by the filter and then fed in part through the pressure regulating valve to the oiler where the air is mixed with oil in the misted form, the oil containing air being adapted to be fed to a power operated fastener driving tool, and in part to a fastener guiding chute as air for forcibly moving the fasteners down the chute.

Figure 2:
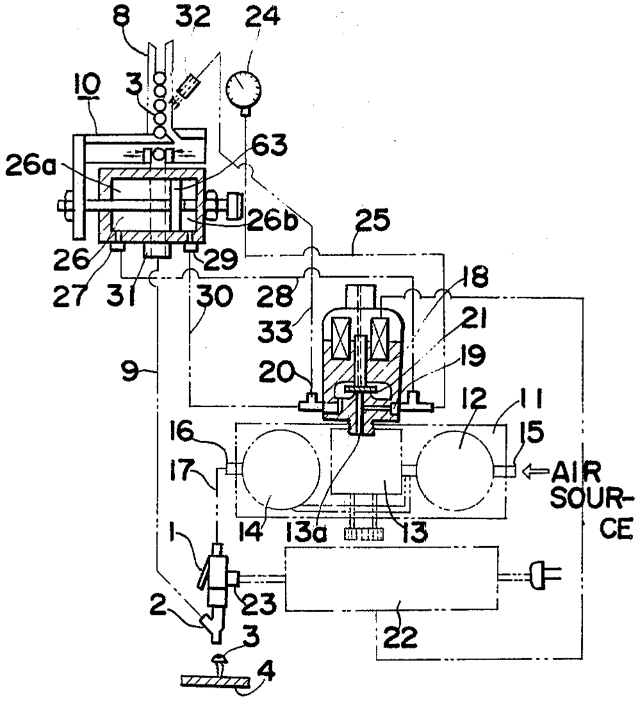
Figure 3:
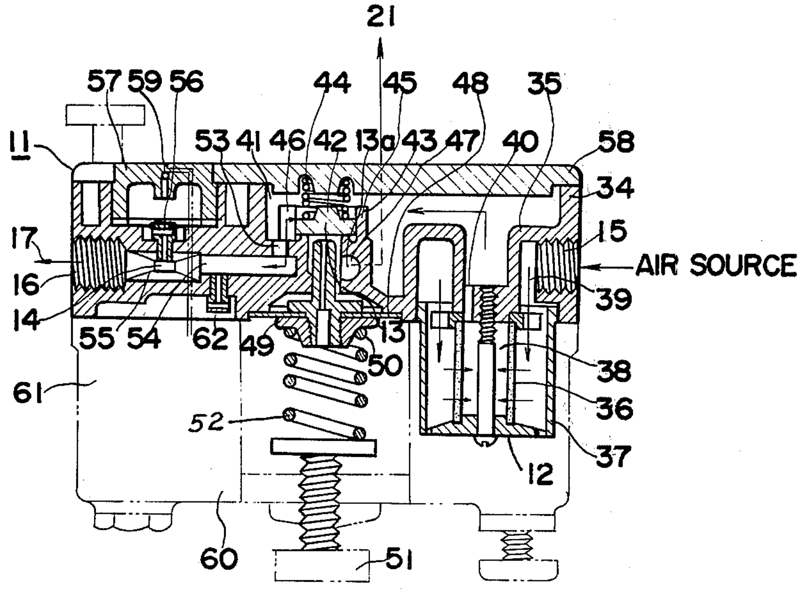

These and other objects and features of the present invention will become apparent from the following description taken in conjunction with a preferred embodiment thereof with reference to the accompanying drawings, in which:

FIG. 1 is a schematic side view of an automatic fastener feeding and driving apparatus to which the present invention is applicable, FIG. 2 is a schematic diagram showing a fluid circuit of the air servicing unit, employed in the apparatus of FIG. 1, and FIG. 3 is a sectional view, on an enlarged scale, of an essential portion of the air servicing unit shown in FIG. 2.

Referring to the drawings, an automatic fastener feeding and driving apparatus comprises a fastener feeding unit 5 and a power operated driving tool 1. The power operated driving tool 1 shown is in the form of a screw driver and has a driver head 2 designed so as to receive fasteners, for example, screws 3, that have fed thereto from a lateral side of the head 2 through a flexible tube 9 successively and one by one at the will of the operator, and to subsequently drive each screw into a workpiece 4 where it is to be fastened.

The fastener feeding unit 5 includes a container 6 for accommodating a mass of the screws 3, a supply drum 7 having a plurality of scoopers for upwardly scooping the screws 3 from the bottom of the container 6 as the drum 7 rotates, a downwardly inclined chute 8 for receiving the screws that have upwardly been scooped from the container and downwardly guiding them in a row, and an escapement block 10 coupled to the lowermost end of the chute for separating the downwardly guided screws one by one and for transferring each of the screws from the chute onto the flexible tube 9 leading to the screw driver 1.

An air serving unit 11 may be housed in position beneath the chute 8 and includes an air filter section 12, a pressure regulating valve 13 and an oiler section 14 or oil atomizer, all being formed in a single flat cubic block. The block 11 is formed with an air intake port 15 adapted to be coupled to a source of air for supplying air therethrough into the filter section 12 and to an outlet port 16 adapted to be coupled to the screw driver 1 by means of a flexible pipe 17 for supplying air mixed with misted oil from the oiler 14 therethrough to an air motor (not shown) built into the screw driver 1.

The pressure regulating valve 13 has an outlet port 13*a* into which an electromagnetic valve assembly 18 is threaded. This electromagnetic valve assembly 18 has a normally opened first port 19 and a second port 20 which is opened only when the valve assembly is electrically energized. The valve assembly 18 further has an inlet port 21 to which air passing through the pressure regulating valve 13 is supplied.

An electrical control unit 22 is housed in position within a housing structure for the feeding unit 5 and is designed so as to control the electromagnetic valve assembly 18 in response to an electrical signal sensed and fed from a sensor 23 built into the screw driver 1. A pressure gauge 24 is connected to the first port 19 of the electromagnetic valve assembly 18 through a line 25.

The escapement block 10 has a cylindrical chamber 26 divided into first and second compartments 26*a* and 26*b* by a piston 63 and is formed with first and second ports 27 and 29 through which lines 28 and 30 are respectively communicated to the compartments 26*a* and 26*b*. The escapement block 10 is also formed with a fastener feed opening 31 from which the flexible tube 9 extends to the driving head 2.

The chute 8 includes a blower 32 communicated with the second port 20 through a line 33, said blower 32 being adapted to blow air towards the row of the screws 3 on the chute 8 for forcibly feeding the screws 3 down the chute 8 onto the escapement block 10.

The details of the interior of the air servicing unit 11 will now be described with reference to FIG. 3.

From FIG. 3, it will be seen that the air intake port 15 is formed in a lateral wall of a block 34 in the lengthwise direction having a partition wall 35 defining a passage leading to a filter section situated therebelow. A cylindrical filter 36 is detachably secured to one end of the partition wall 35 by a rod 38 through a cylindrical baffle 37 having one end closed and mounted in position in coaxial relation to said filter 36. Air passages 39, 40 are located between the partition wall 35 and the filter section 36 and a passage formed in the partition wall 35 in spaced relation to the filter 36, respectively. Reference numeral 41 indicates an air pocket. A main valve member 42 forms a part of the pressure regulating vlave 13 and is made of elastic material. The main valve member 42 is supported in position within an annular projection 43, has a cut-out portion formed as at 46, and is normally biased towards an annular valve seat 45 by the action of a spring element 44. A clean air passage 47 communicates with the electromagnetic valve assembly 18, said clean air passage 47 being adapted to draw an air which does not contain misted oil from the cut-out portion 46 in the inlet port 21. A diaphragm member 48, is mounted with an axially bored relief valve 49 which is supported in position within the annular valve seat 45 in coaxial relation for sliding movement in an axial direction thereof. Opposed to the relief valve 49, the diaphragm member 48 is provided with a seat member 50 for receiving a spring element 52 having one end engaged to said seat member 50 and the other end associated to an adjustment bolt 51. It should be noted that, by turning the adjustment bolt 51, an axially acting spring force exerted by the spring element 52 on the diaphragm member 48 can be adjusted.

The air pocket 41 is communicated through a passage 53 with a horizontally extending passage 54 which is in turn communicated to an oiler section 14 for supplying a portion of the introduced air from the air pocket 41 to the oiler section 14.

At one end of the passage 54 remote from the passage 53 and between said passage 54 and the outlet port 16, a nozzle area 55 is formed where misted oil is mixed with the air passing from the passage 54 to the outlet port 16. It will be seen that the air emerging from the outlet port 16 contains oil in the misted form which is in turn fed to the air motor (not shown) of the screw driver 1. Like the intake port 15, the outlet port 16 is formed in the opposed lateral wall of the block 34 in the lengthwise direction.

The nozzle area 55 includes an oil injecting nozzle 56 for injecting oil into the air flowing through the nozzle area 55 at a relatively high speed. A cap 57 inserted into a cover 58 has an oil dropping hold formed as at 59 and is positioned relative to the cover 58 in such a way as to permit the oil dropping hole 59 to be situated immediately above the oil injecting nozzle 56. The oil dropping hole 59 is in communication through a pipe (not shown) with an oil reservoir 61 formed in a lower casing block 60 so that oil in the oil reservoir 61 can be sucked and fed to said hole 59.

The horizontally extending passage 54 is also communicated with the oil reservoir 61 through an air port 62 for introducing a portion of the air, flowing in said passage 54, to said oil reservoir 61 so that the oil reservoir 61 can be pressurized to force the oil to flow into the pipe (not shown) and then towards the oil dropping hole 59.

From the foregoing description, it has now become clear that the air fed from the air source (not shown) into the intake port 15 passes through the filter section 12 and is fed in part to the electromagnetic valve assembly 18 through the pressure regulating valve 13 and in part to the oiler section 14 without passing through the valve 13. The portion of the air emerging from the electromagnetic valve assembly 18 is therefore reduced in pressure and does not contain misted oil, while the portion of air emerging from the oiler 14 is not reduced in pressure and contains misted oil. The air with no misted oil is then fed to the blower 32 and the air with misted oil is then fed through the outlet port 16 to the air motor (not shown) of the screw driver 1.

On the other hand, the air fed to the electromagnetic valve assembly 18 is in turn fed through the first port 19 to the compartment **26*a* of the cylindrical chamber 26 of the escapement block 10 thereby pressing the piston 63 to the right as shown in FIG. 2. Subsequent to generation of an electrical signal from the sensor 23 in the screw driver 1, the electromagnetic valve assembly 18 becomes energized by the control unit 22 whereby the second port 20 is opened. Upon opening of the second port 20, the air under pressure flowing from the valve 13 is fed through the line 30 by means of the port 29 to the compartment 26*b* of the cylindrical chamber 26 of the escapement block 10, thereby causing the piston 63 to move to the left by the effect of pressure differential between the pressures applied on both sides of the piston 63. Each time the piston 63 is moved to the left, the screws 3 resting on the chute 8 in a row are successively and one by one transferred to the driving head 2 of the screw driver 1 through the tube 9. Each screw fed to the driving head 2 is subsequently driven or screwed into the workpiece 4 by the air motor (not shown). It should be understood that, upon completion of the driving or screwing operation with respect to each screw 3, the sensor 23** generates the electrical signal in readiness for the next driving or screwing operation.

While the screws are successively fed and one by one driven into the workpiece in the manner as hereinbefore described, the fluid servicing unit for the automatic fastener feeding and driving machine according to the present invention comprises the filter section 12, the pressure regulating valve 13 and the oiler section 14, all being formed in a single block. Therefore, the fluid servicing unit of the present invention is advantageously compact in size and does not require any complicated piping, thus substantially eliminating many problems.

Moreover, manintenance of the fastener feeding and driving apparatus will be inexpensive and it can be readily repaired, due to the fact that the filter, the pressure regulating valve and the oiler are integrated into a single fluid servicing unit. In addition, since the fluid servicing unit in itself is compact in size, it contributes to reduction of the overall size of the fastener feeding and driving apparatus.

Though the present invention has been fully described by way of the preferred embodiment thereof, it should be noted that various changes and modifications are apparent to those skilled in the art and, therefore, such changes and modifications should be construed as included within the true scope of the present invention unless otherwise they depart therefrom.

We claim:

1. A fluid servicing unit for an automatic fastener feeding and driving apparatus which has a fastener container, a fluid operated fastener driving tool, a fluid operated mechanism for feeding fasteners from the fastener container to an escapement mechanism from which the fasteners are fed one by one to a fluid operated driving tool, and an electrical control unit for controlling the operation of the apparatus, said servicing unit comprising:

air treatment means connected at an inlet to an air source for filtering, selectively pressure regulating, and selectively oil atomizing air passing therethrough, said air treatment means further having first and second outlets, the second outlet being connected to said fluid operating driving tool and emitting said oil atomized air therethrough; and electromagnetic valve assembly means operatively pneumatically connected to said first outlet from said air treatment means from which said pressure regulated air is emitted and connected to said escapement mechanism for regulating the flow of air to said escapement and feed mechanism in response to an electrical signal directed and sent thereto from said electrical control unit.

2. An apparatus as claimed in claim 1 wherein said air treatment means is comprised of:

a detachable filter means connected to said inlet for filtering the air entering into said air treatment means;

adjustable pressure regulating valve means operatively connected to said filter means and connected to said electromagnetic valve assembly means at the outlet therefrom for reducing the pressure of the filtered air directed to the electromagnetic valve assembly means; and oiler means operative pneumatically connected to the filter means and to said fastener driving tool for atomizing the filtered air passing therethrough toward said fastening tool.

3. An apparatus as claimed in claim 2 wherein said oiler means is comprised of:

an oil reservoir operatively pneumatically connected to the air flowing from said air filter means, whereby the oil reservoir is pressurized;

an oil injecting nozzle preceding the second outlet from the air treatment means for injecting oil into the filtered air passing through said apparatus toward said fastening tool; and supply means for supplying oil from the reservoir to the nozzle under the pressure of the air flowing into the oil reservoir from the filter means.

4. An apparatus as claimed in claim 2 wherein said air filter means is comprised of:

a hollow cylindrical filter; and a baffle surrounding and spaced from the sides of said hollow cylindrical filter and covering one end of said filter forming a space between the walls of the baffle and the outer wall of the filter, said space being connected to said inlet, whereby air entering said inlet flows into the space between the filter and the baffle, through the filter, and towards said pressure regulating valve means and said oiler means.

* * * * *